Dec. 11, 1962 C. B. TRIMBLE 3,068,455

MAGNETIC DRUM STORAGE SYSTEMS

Filed May 20, 1960 7 Sheets-Sheet 1

INVENTOR
CEBERN B. TRIMBLE
BY Louis A. Kline
Richard G. Stahr
HIS ATTORNEYS

Dec. 11, 1962 C. B. TRIMBLE 3,068,455

MAGNETIC DRUM STORAGE SYSTEMS

Filed May 20, 1960 7 Sheets-Sheet 2

INVENTOR
CEBERN B. TRIMBLE

BY Louis A Kline
Richard G. Stahr

HIS ATTORNEYS

Dec. 11, 1962 C. B. TRIMBLE 3,068,455

MAGNETIC DRUM STORAGE SYSTEMS

Filed May 20, 1960 7 Sheets-Sheet 3

INVENTOR
CEBERN B. TRIMBLE
BY Louis A Kline
Richard G. Stahr
HIS ATTORNEYS

MAGNETIC DRUM STORAGE SYSTEMS

INVENTOR
CEBERN B. TRIMBLE

BY Louis A. Kline
Richard G. Stahr

HIS ATTORNEYS

INVENTOR
CEBERN B. TRIMBLE
BY Louis A Kline
Richard G. Stahr
HIS ATTORNEYS

MAGNETIC DRUM STORAGE SYSTEMS

Filed May 20, 1960 7 Sheets-Sheet 6

INVENTOR
CEBERN B. TRIMBLE

BY Louis A Kline
Richard G. Stahr
HIS ATTORNEYS

INVENTOR
CEBERN B. TRIMBLE
BY Louis A. Kline
Richard G. Stahr
HIS ATTORNEYS

United States Patent Office 3,068,455

Patented Dec. 11, 1962

3,068,455

MAGNETIC DRUM STORAGE SYSTEMS

Cebern B. Trimble, Dayton, Ohio, assignor to The National Cash Register Company, Dayton, Ohio, a corporation of Maryland Filed May 20, 1960, Ser. No. 30,635
12 Claims. (Cl. 340—174.1)

Figure 1:
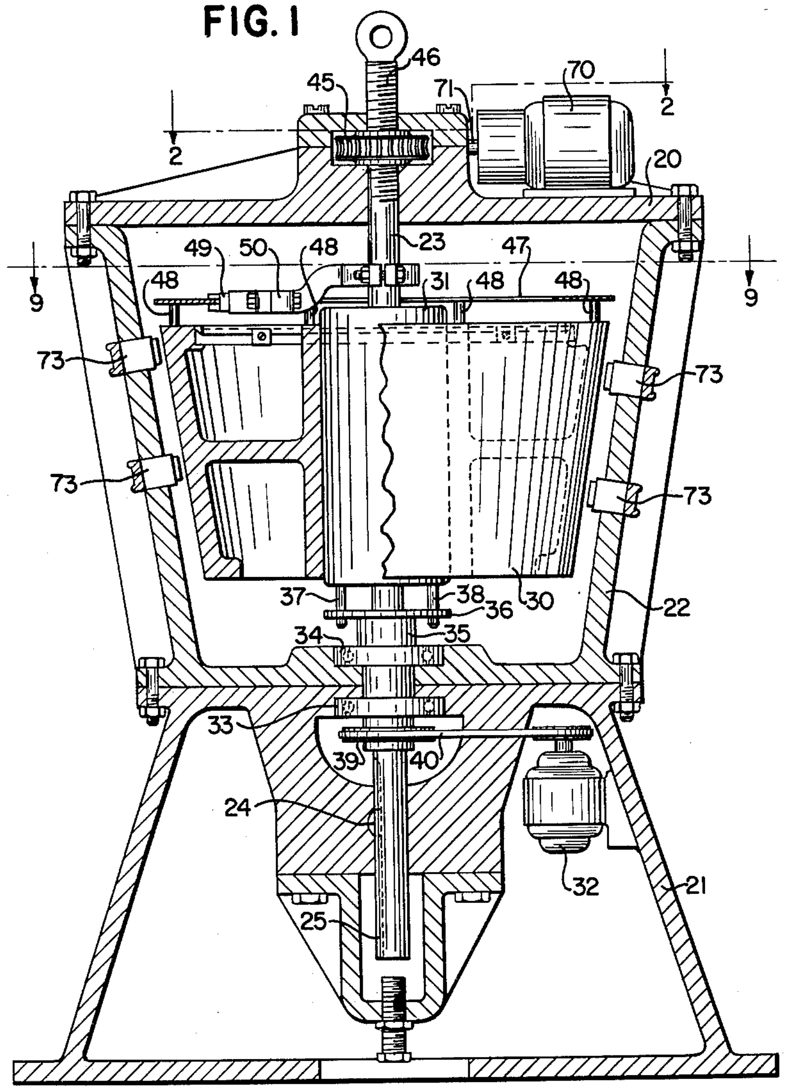

The present invention relates to magnetic drum memory systems and, more specifically, to systems of this type in which the distance between the magnetic recording surface and the associated magnetic head units may be maintained substantially constant during operation.

The recording surface of a memory drum is almost always an extremely thin coating or plating of a magnetic material. In view of this, magnetic recording drums must be handled with extreme caution, in that the slightest abrasion will seriously damage or destroy the magnetic recording surface. For optimum magnetic efficiency and high storage density, the magnetic head units are positioned in extremely close proximity, in the order of thousandths of an inch or less, with the magnetic recording surface of a drum during the periods during which information is being processed. Because of these very close tolerances, the most frequent cause of magnetic drum damage is the intimate contact of the magnetic head units wtih the recording surface.

It is not uncommon for the magnetic recording units and the magnetic surface of a drum to come into intimate contact during operation because of changes in drum and supporting member dimensions due to the expansion of the drum with increases of ambient temperature. Similarly, periods of resonant vibration which may be encountered as the drum is being accelerated or decelerated may be of sufficient amplitude to cause the magnetic recording and reading units to come into intimate contact with the recording surface.

One method of substantially reducing the probability of damage of this type is the provision of a magnetic drum memory system in which the clearance between the magnetic head units and the recording surface is maximum during periods of acceleration and deceleration of the drum and is automatically maintained substantially constant during operation.

As the use of magnetic drum memory systems is becoming increasingly popular, the requirement of a magnetic memory system of this type is apparent.

It is, therefore, an object of this invention to provide an improved magnetic drum memory system.

It is another object of this invention to provide an improved magnetic drum memory system wherein the clearance between the magnetic recording and reading units and the recording surface is maintained substantially constant during operation.

It is another object of this invention to provide an improved magnetic drum memory system wherein the clearance between the recording surface and the magnetic head units is maximum during periods of acceleration and deceleration of the drum and is maintained substantially constant during operation.

It is another object of this invention to provide an improved magnetic drum recording system wherein the magnetic head units may be initially accurately positioned, using the drum member as a gauge block.

In accordance with this invention, a magnetic drum memory system is provided wherein a plurality of magnetic head units, supported by a frame member, are located adjacent to the magnetic recording surface of a rotatably-mounted frusto-conical drum member, which may be displaced in an axial direction and positioned in such a manner that the distance between the recording surface and each of the magnetic head units is equal to the distance between the recording surface and every other magnetic head unit, whereby axial movement of the drum member in a first direction will increase the distance between the recording surface and the magnetic head units, while axial movement of the drum member in the opposite direction will decrease the distance between the recording surface and the magnetic head units. A sensing device for producing first and second signals as the distance between the recording surface and the magnetic head units becomes less than a predetermined minimum or greater than a predetermined maximum, respectively, is also provided, and is arranged to actuate a drum-positioning mechanism to axially displace the drum member in a first direction for increasing the distance between the recording surface and the magnetic head units in response to the first signals, and in the opposite direction for decreasing the distance between the recording surface and the magnetic head units in response to the second signals, respectively, whereby the distance between the recording surface and the magnetic head units may be maintained substantially constant during operation.

Figure 2:
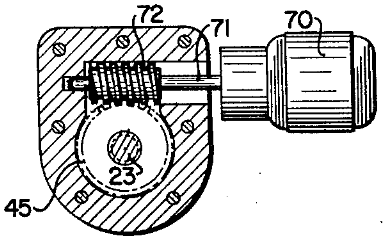
Figure 3:
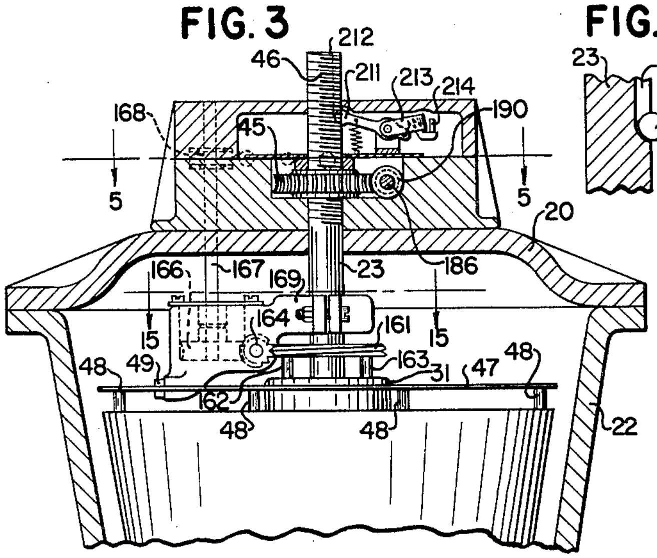
Figure 4:
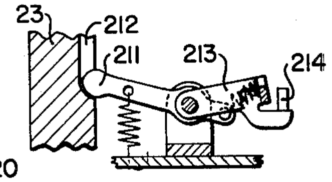
Figure 5:
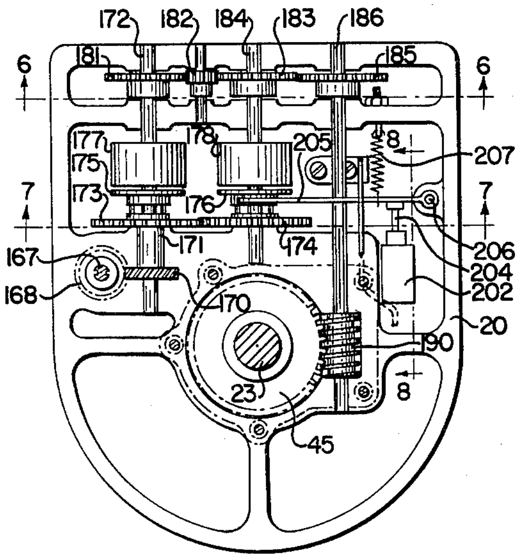
Figure 6:
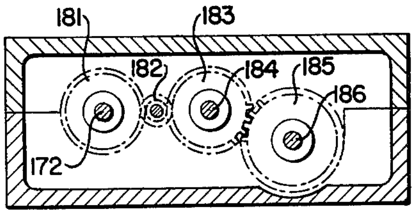
Figure 7:
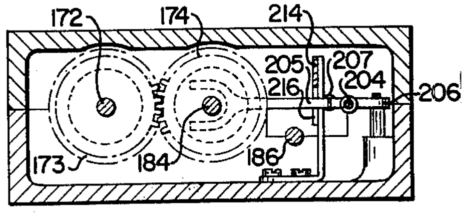
Figure 8:
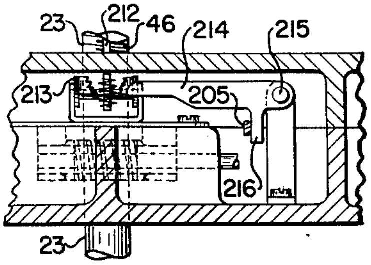
Figures 9, 15, 16:
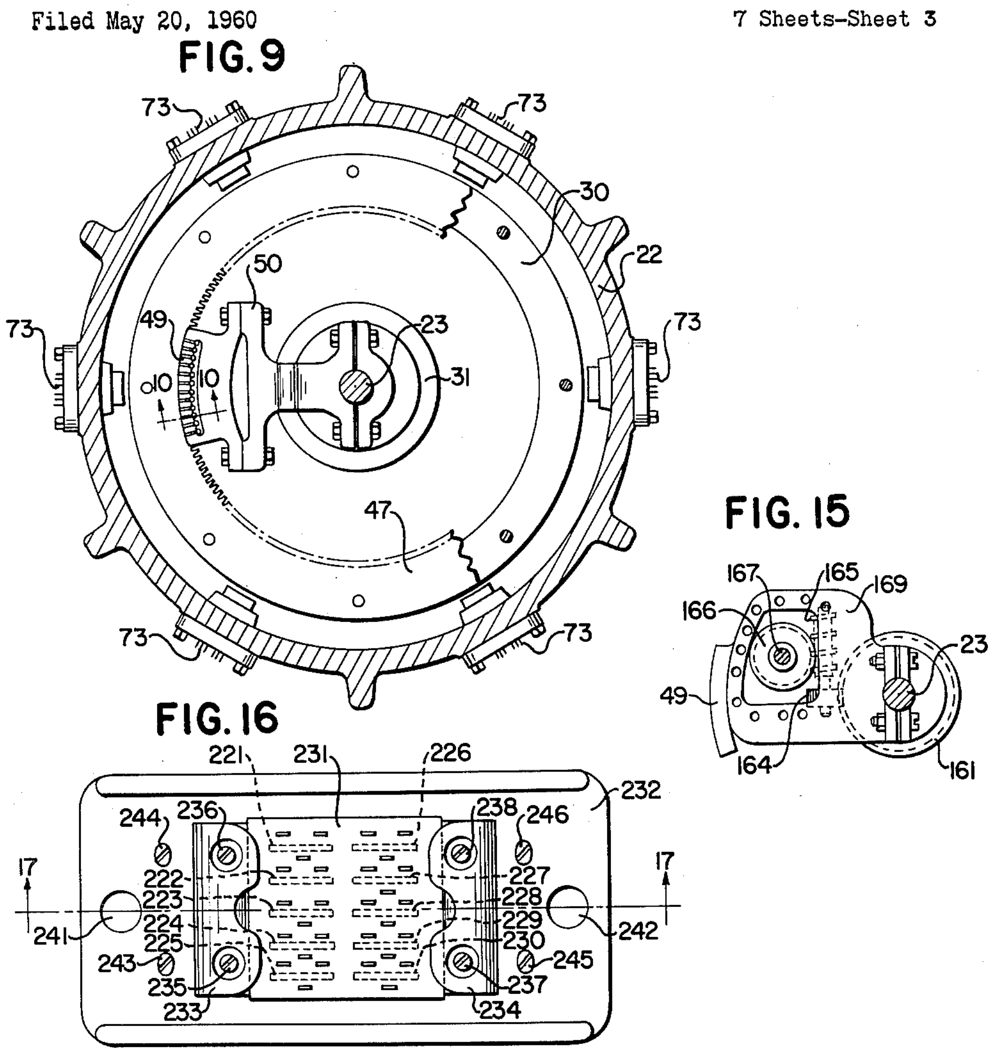
Figure 17:
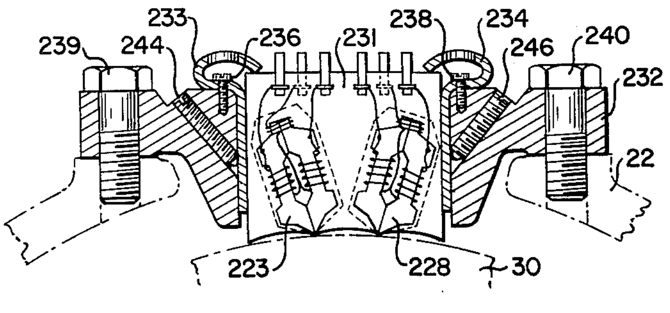
Figures 10, 11:
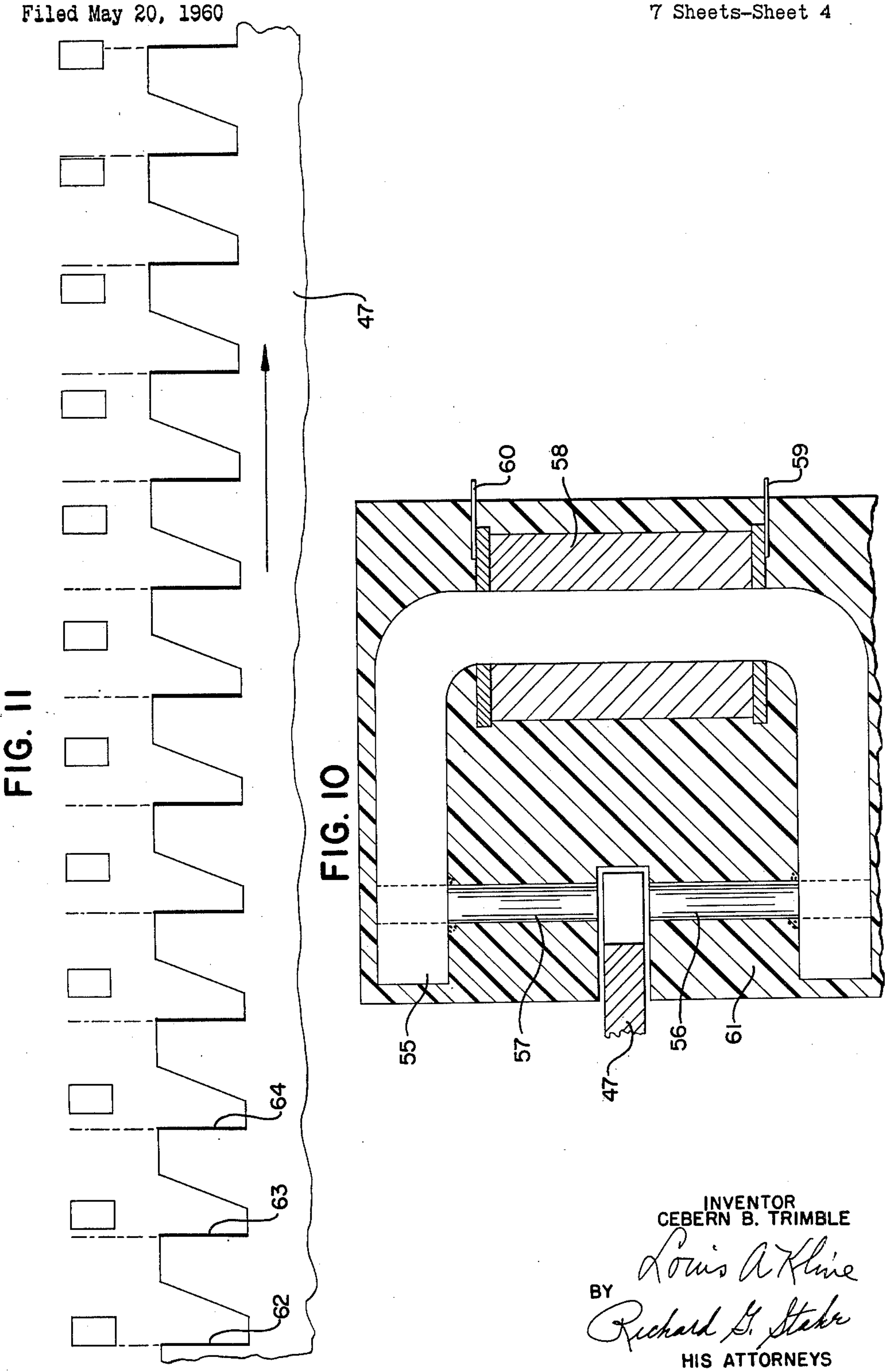
Figure 12:
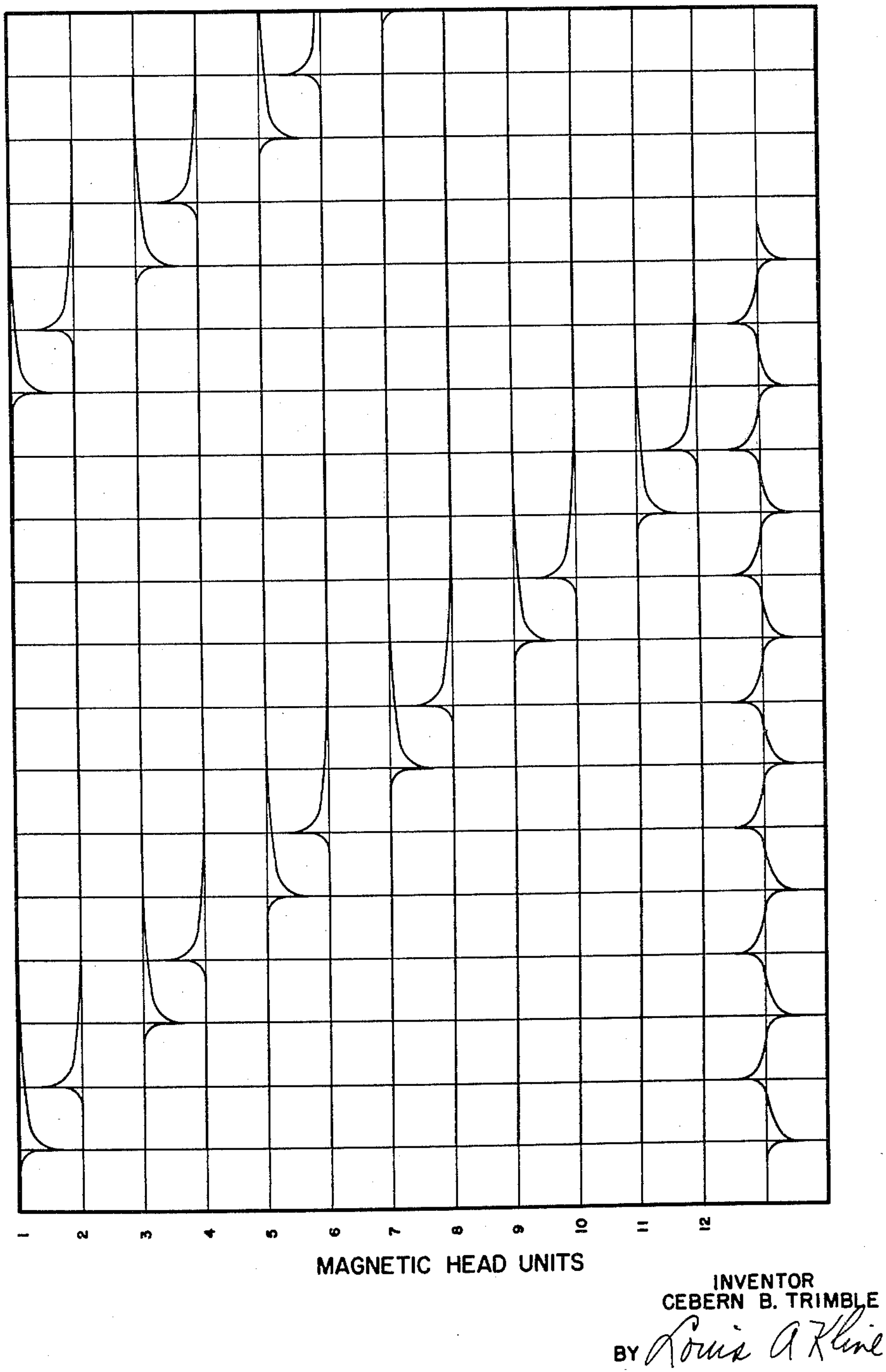
Figure 13:
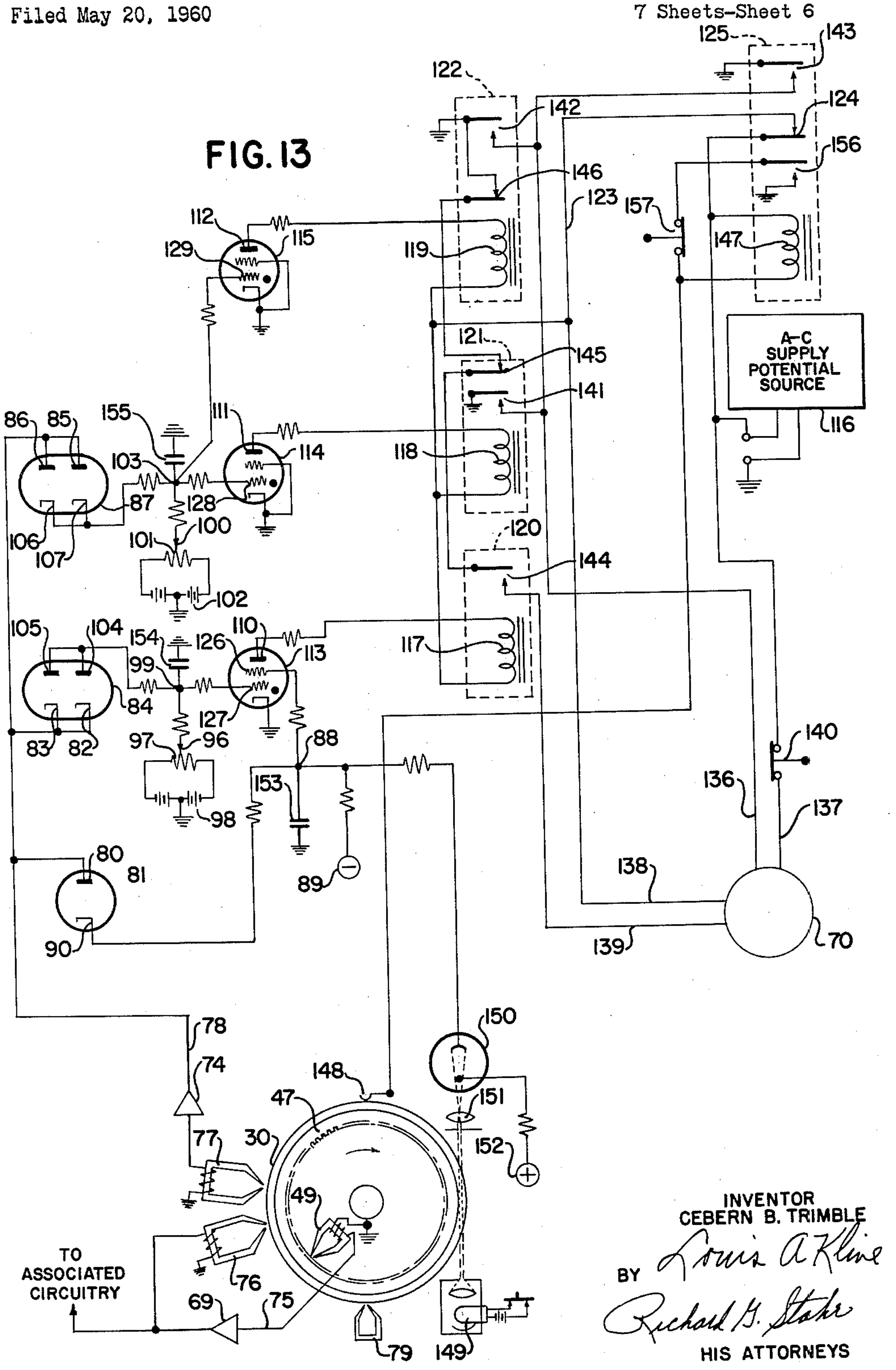
Figure 14:
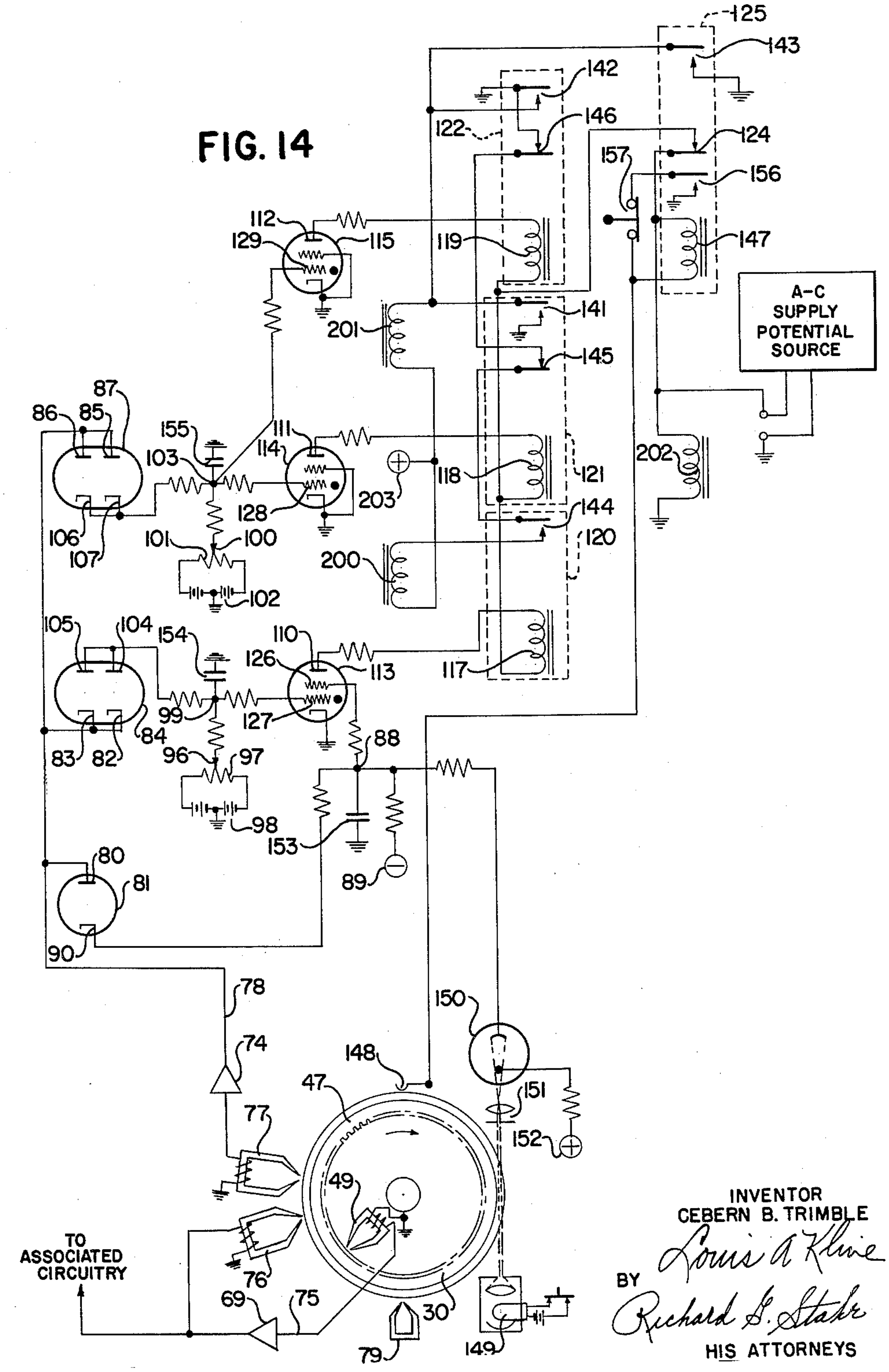

For a better understanding of the present invention, together with further objects, advantages, and features thereof, reference is made to the following description and accompanying drawings, in which:

FIGURE 1 is a front elevation, partially in cross-section, of one embodiment of the present invention, FIGURE 2 is a cross-section view of a portion of FIGURE 1, taken along line 2—2 and looking in the direction of the arrows, FIGURE 3 is a fragmentary front elevation, partially in cross-section, of another embodiment of the present invention, FIGURE 4 is an enlarged detail of a portion of FIGURE 3, FIGURE 5 is a top cross-section view of FIGURE 3 taken along line 5—5, and looking in the direction of the arrows, FIGURE 6 is a cross-section view of a portion of FIGURE 5, taken along line 6—6, and looking in the direction of the arrows, FIGURE 7 is another cross-section view of FIGURE 5, taken along line 7—7, and looking in the direction of the arrows, FIGURE 8 is a cross-section view of a portion of FIGURE 5, taken along line 8—8, and looking in the direction of the arrows, FIG. 9 is a top cross-section view of FIGURE 1 taken along line 9—9, and looking in the direction of the arrows, FIGURE 10 is a cross-section view of a clock magnetic head unit, FIGURE 11 is a diagram of a clock pulse generator system, FIGURE 12 is a diagram of the clock pulses generated by the system of FIGURE 11, FIGURE 13 is a schematic wiring diagram of the electronic circuitry required with the embodiment of FIGURE 1, FIGURE 14 is a schematic diagram of the electronic circuitry required with the embodiment of FIGURE 3, FIGURE 15 is a top view of a portion of FIGURE 3 taken along line 15—15 and looking in the direction of the arrows, FIGURE 16 is a top plan view of a magnetic head unit adjusting arrangement, and FIGURE 17 is a cross-section view of FIGURE 16 taken along line 17—17 and looking in the direction of the arrows.

Referring to the drawings, wherein like elements have been given like characters of reference throughout the several views, FIGURE 1 is a front elevation view, partially in cross-section, of one embodiment of the magnetic drum memory system of this invention. The several members which make up this novel magnetic drum memory system are supported by a frame member herein indicated as being composed of three separate units; a top unit 20, a mounting unit 21, and a center unit 22. It is to be specifically understood, however, that the frame member may be composed of more or fewer units and may be of a shape or form different from that indicated in FIGURE 1, which is illustrative only.

An axle member 23 is supported by and arranged to be axially displaceable only relative to the frame member. The opposite ends of the axle member 23 pass through respective axially aligned bores which are provided in the top unit 20 and the mounting unit 21 of the frame member. The diameter of the bores is sufficiently greater than the diameter of the axle to permit axial displacement of the axle member 23. So that the axle member 23 may be axially displaceable only relative to the frame member, a key 24, arranged to slidably fit into a slot 25 of the axle member 23, prevents rotational displacement but permits axial displacement.

A frusto-conical drum member 30, having a magnetizable recording surface area, is rotatably mounted upon and arranged to be axially displaceable with the axle member 23. The angle of taper of the drum member 30 has been exaggerated in FIGURE 1 for purposes of clearly illustrating an important feature of the novel drum memory system of this invention. In a practical embodiment, the taper of the drum member 30 would be extremely small, being in the order of .5 degree, an angle which it is impossible to show clearly with a small-scale drawing. To arrange for the rotatable mounting of the drum member 30 upon the axle member 23, a precision spindle bearing may be employed. This spindle bearing may be of the anti-friction type, having an outer race 31, press-fit into a center bore of the drum member 30, and an inner race, not shown, press-fit upon the axle member 23. The drum member 30 is, therefore, free to rotate about the axle member 23 and is axially displaceable therewith.

The axle member 23 is contained by a drum-positioning spur gear 45, the bore of which is threaded to match the threads 46 of the axle member 23. By revolving the drum-positioning spur gear 45, the axle member 23 may be axially displaced, the direction depending upon the direction of rotation of the gear 45. As the drum member 30 is axially displaceable with the axle member 23, the drum-positioning spur gear 45 may be operated to accurately position drum member 30.

To rotate drum member 30, a conventional electric motor 32 may be employed. Two anti-friction-type bearings 33 and 34 are mounted upon the mounting unit 21 and the center unit 22 of the frame member and are arranged to have their outer races held stationary either by means of a press-fit into respective bores provided therefor or through a set screw arrangement. A hollow shaft member 35 is press-fit within the inner race bores of the anti-friction bearings 33 and 34, whereby the shaft 35 may be revolved about the axle member 23 on the bearings 33 and 34. A plate member 36 is rigidly secured to one end of shaft 35 and is, of course, rotatable therewith. Dog membes 37 and 38 are rigidly secured to plate member 36 and are arranged to slidably fit into holes provided in outer race 31 of the spindle bearing upon which drum member 30 revolves. These dogs are arranged to be of sufficient length to engage the holes in race 31 as drum member 30 is displaced axially with axle member 23 over the extremes of its travel. A pulley member 39 is press-fit onto the opposite end of shaft member 35 and is driven by motor 32 through a belt 40. Therefore, the rotary motion supplied by the motor 32 is transmitted through the belt 40, the pulley 39, the shaft member 35, the plate member 36, and the dog members 37 and 38 to the drum member 30.

To produce a signal pulse for each bit position around the circumference of drum member 30, a disk 47 is rigidly secured to and spaced away from drum member 30 by a series of dowels typically illustrated by reference numeral 48. Disk 47 is composed of a magnetic material and has a series of teeth around the periphery of a center bore, as illustrated in FIGURE 9, which are arranged to pass through the air gaps of a series of magnetic head units. As the magnetic teeth pass through the air gap of a head unit, the reluctance of the magnetic circuit is altered, which results in an output signal pulse. Assuming that drum member 30 has 1596 bit positions around its circumference, the clock pulse generator must produce 1596 equally-spaced pulses for each revolution of the drum. While this may be accomplished by a disk 47 having 1596 equally-spaced teeth about its inner periphery passing through the air gap of a single magnetic head unit, it is possible to reduce the number of teeth required by increasing the number of magnetic head units, which results in more durable teeth on the disk. The number of teeth required with the proposed clock pulse generator disk 47 may be reduced by a factor of six, 1596 bit positions divided by six, or 266 teeth passing through the air gaps of six magnetic head units. However, if the proposed associated processing system requires retiming of the drum information at half bit times, half-after clock pulses are also required and may be generated by an additional group of six magnetic head units. On this basis, a total of twelve magnetic head units scanned by the 266 clock teeth are required. These twelve magnetic head units may be formed into an integral unit 49 (FIGURE 1) by imbedding them within an investment material such as the epoxy or acrylic resins, for example. The integral magnetic head unit 49 is mounted upon a bracket arm 50, which is securely clamped to the axle member 23, as indicated. With this arrangement, as the axle member 23 and the drum member 30 are axially displaced in either direction, the clock pulse generator disk 47 and the integral magnetic head unit 49 will be axially displaced therewith. FIGURE 10 is a cross-section view of a portion of FIGURE 9, taken along line 10—10 and looking in the direction of the arrows. Each magnetic head unit may be composed of a U-shaped member of a magnetic material 55 having oppositely-opposed permanent magnetic members 56 and 57 located across its open end and spaced apart at the free ends to provide an air gap. A pick-up coil 58 is wound upon the base of member 55 and is provided with output leads 59 and 60. As each tooth of disk 47 passes through the air gap, the reluctance of the magnetic circuit is substantially reduced, resulting in an increased flow of magnetic flux and an induced output signal in pick-up coil 58 which appears across output leads 59 and 60. As has been brought out previously, the magnetic head units may be imbedded within an investment material 61, as indicated. A clearance is provided between the magnets 56 and 57 and the teeth of the disk 47 to provide for flutter which may occur in the disk.

FIGURE 11 graphically illustrates the relationship of the teeth of the disk 47 to the magnetic head units as it revolves in the direction of the arrow. For purposes of clearly illustrating this relationship, a section of the disk 47 and the included teeth has been laid out in a straight line, and each of the twelve magnetic head units has been illustrated as an oblong. An output pulse is produced as the leading edge of a tooth enters the air gap of a magnetic head unit; therefore, the spacing between the magnetic head units is arranged to be such that the leading edge of only one tooth is entering the air gap of a single magnetic head unit at any given instant. In FIGURE 11, a tooth 62 is at the moment of entrance into the air gap of the extreme right magnetic head unit.

One bit time later, the leading edge of a tooth 63 will be entering the air gap of the next magnetic head unit, while two bit times later, the leading edge of tooth 64 will be entering the air gap of the third magnetic head unit. With this arrangement, as a single tooth progresses from the air gap of one magnetic head unit to the next, all of the other magnetic head units will have been scanned by other single teeth, but all at a different time. That is, a total of twelve output signal pulses will be produced as a tooth advances one magnetic head unit position.

FIGURE 12 graphically illustrates the clock pulses produced by the clock generator of this invention. As a tooth 62 enters the air gap of the first magnetic head unit, an output pulse is produced. There will not be another output pulse produced by the first magnetic head unit until the leading edge of the next tooth of disk 47 scans the air gap thereof. However, as disk 47 revolves, the leading edge of tooth 63 next scans the air gap of the second magnetic head unit, thereby producing an output signal pulse one bit time later. As with the first magnetic head unit, an output signal pulse will not be produced by the second magnetic head unit until its air gap is scanned by the leading edge of the next tooth, in this instance tooth 62. As disk 47 continues to revolve with drum member 30, the air gaps of successive magnetic head units are scanned by the leading edges of respective teeth. In this manner, successive pulses are produced by each successive magnetic head unit, as indicated in FIGURE 12. The bottom curve of FIGURE 12 indicates how the clock generator pulses may appear when mixed into a common clock line. Alternate polarity clock pulses are produced, so that the half-after drum timing pulses may be distinguished from the clock generated pulse. To obtain the opposite polarity signals, it is only necessary to change the phase connections of the pick up coils in the respective magnetic head units.

To operate the drum-positioning spur gear 45, a conventional servo motor 70 may be employed. The servo motor 70 is coupled to the drum-positioning spur gear 45 through its shaft 71 and worm gear 72. Therefore, as the shaft 71 of the servo motor 70 is revolved in either direction, the worm gear 72 drives the drum-positioning spur gear 45, thereby axially displacing the axle member 23 and the drum member 30. As the rotation of servo motor 70 is reversed, axle member 23 and drum member 30 wil be axially displaced in the opposite direction through the action of drum-positioning spur gear 45. The signals to which servo motor 70 is responsive will be described in detail later in this specification.

A plurality of magnetic head units, herein typically illustrated by reference numeral 73, are supported by the frame member, located adjacent to the recording surface of drum member 30, and are positioned in such a manner that the distance between the recording surface and each of the magnetic head units is equal to the distance between the recording surface and every other magnetic head unit; that is, the magnetic head units and the magnetic recording surface of drum member 30 lie along parallel planes. With this arangement, axial movement of the drum member 30 in a direction toward the apex, hereinafter referred to as the "close" direction, will decrease the distance between the magnetic recording surface of the drum member 30 and the magnetic head units 73, while axial movement of the drum member 30 in the opposite direction, hereinafter referred to as the "open" direction, will increase the distance between the magnetic recording surface of the drum member 30 and the magnetic head units 73.

The direction of rotation of servo motor 70, which drives or actuates drum-positioning spur gear 45, determines the direction of axial displacement of drum member 30. So that servo motor 70 may be energized to rotate in the proper direction to produce an axial displacement of drum member 30 in the "open" direction as the clearance between the magnetic head units 73 and the magnetic recording surface of drum member 30 becomes too small or in the opposite or "close" direction as the clearance becomes too great, a sensing circuit is provided for producing first and second signals, to which servo motor 70 is responsive, as the clearance between the magnetic head units 73 and the recording surface becomes less than a predetermined minimum or greater than a predetermined maximum, respectively. The proximity of the magnetic head units and the magnetic recording surface may be determined inductively, capacitively, or optically and the first and second signals derived from this determination. For purposes of illustration and without intention or inference of a limitation thereto, a method of inductive determination will be described; however, it is to be specifically understood that alternate methods and/or principles may be used without departing from the spirit of this invention. This arrangement is schematically illustrated in FIGURE 13, where the clock pulses appearing in the pick-up coils of integral magnetic head unit 49 are mixed in a common clock line 75 and directed to a magnetic recording head unit 76 located adjacent to one of the tracks of the magnetic recording surface of drum member 30 through a conventional amplifier 69, if required. The clock signals recorded upon the magnetic surface of drum member 30 are detected by a magnetic pick-up unit 77, which also is located adjacent to the magnetic recording surface of drum member 30, and appear as high-frequency alternating current signals in line 78. A conventional amplifier 74 may be included in line 78, if required. So that the clock signals may be recorded as they are generated, previously recorded clock signals are erased by a permanent magnet 79.

The high-frequency alternating current signals appearing in line 78 are applied through conventional amplifier 74, if required, to the anode 80 of a diode 81, the cathodes 82 and 83 of a duo-diode 84, and the anodes 85 and 86 of a duo-diode 87. It is not necessary that the components 84 and 87 be duo-diodes, but they have been shown as such to demonstrate a safety feature. In the event either diode of these components should fail, the sensing circuit would remain operative. Similarly, the diodes need not be enclosed within the same envelope and may also be of the solid state or crystal type.

The point 88 is normally at a negative potential from the source of negative potential 89. This negative potential, which is applied to the cathode 90 of the diode 81, forward biases diode 81. Wiper arm 96 of potentiometer 97, connected across a source of direct current potential 98, is adjusted to normally place point 99 at a positive potential, while wiper arm 100 of potentiometer 101, connected across a source of direct current potential 102, is adjusted to normally place point 103 at a negative potential. The positive potential of point 99, applied to the anodes 104 and 105 of duo-diode 84, forward biases duo-diode 84, while the negative potential of point 103, applied to the cathodes 106 and 107 of duo-diode 87, forward biases duo-diode 87.

The anodes 110, 111, and 112 of respective gas tubes 113, 114, and 115 are connected to the alternating current supply potential source 116 through respective coils 117, 118, and 119 of relays 120, 121, and 122; line 123; and normally-closed contacts 124 of relay 125. With this arrangement, the gas tubes 113, 114, and 115 are forward biased during each positive excursion of the alternating current supply potential cycles. However, the normally negative potential present at point 88, applied to the suppressor grid 126 of gas tube 113, prevents conduction through tube 113 during the positive excursions of the alternating current supply potential cycles even though the normally positive potential present at point 99 is applied to the control grid 127. Similarly, the normally negative potential present at point 103, applied to the control grids 128 and 129 of respective gas tubes 114 and 115, prevents conduction through the tubes 114 and 115 during the positive excursions of the alternating current supply potential cycles.

So that the servo motor 70 may be energized for rotation in either direction, as selected, it includes two separate windings, one for each direction. For purposes of illustration, it will be assumed that lines 136 and 137 are internally connected to the winding of the motor 70, which, when energized, will produce the direction of rotation of the motor 70 which will axially displace the drum member 30 in the "open" direction, and that lines 138 and 139 are internally connected to the winding of the motor 70 which, when energized, will produce the direction of rotation of motor 70 which will axially displace drum member 30 in the "close" direction. For purposes of brevity, these windings will hereinafter be referred to as the "open" and "close" windings. The lines 137 and 138 are connected to the ungrounded side of supply potential source 116 through a conventional limit switch 140 and normally closed contacts 124 of relay 125, respectively. To complete the circuit through the "open" windings of motor 70, it is necessary that line 136 be returned to ground through normally-open contacts 141 of relay 121 or normally open contacts 142 of relay 122 or normally-open contacts 143 of relay 125. Similarly, to complete the circuit through the "close" windings of motor 70, it is necessary that line 139 be returned to ground through normally-open contacts 144 of relay 120 and normally-closed contacts 145 and 146 of respective relays 121 and 122.

Assuming that the memory system of this invention has just been turned on and that drum member 30 is displaced in the extreme "open" position, the distance between the recording surface and the magnetic head units is maximum. With these conditions, the amplitude of the alternating current signal present in line 78 would be of a magnitude too small to be utilized by the sensing circuitry because of the extremely low magnetic efficiency of recording head 76 and read head 77 in respect to the recording surface of drum member 30. However, the light from source 149 illuminates photo-cell 150 through lens system 151. As photo-cell 150 is illuminated, current is conducted therethrough from source of positive potential 152. With photo-cell 150 conducting, the potential of point 88 goes positive, thereby biasing the suppressor grid 126 of gas tube 113 positive, while the control grid 127 is normally biased positive from point 99. With each the suppressor grid 126 and control grid 127 biased positively, gas tube 113 will conduct during each positive excursion of the alternating current supply potentials, thereby energizing coil 117 of relay 120. As relay coil 117 is energized, the normally open contacts 144 are closed, completing a circuit for the "close" windings of motor 70 from the supply potential source 116 through the normally closed contacts 124 of relay 125; line 138; motor 70; line 139; normally open contacts 144 of relay 120, which are now closed in that coil 117 is energized; normally closed contacts 145 of relay 121; and normally closed contacts 146 of relay 122 to ground.

As this circuit is completed, servo motor 70 revolves in the proper direction to drive worm gear 72 (FIG. 2) and the associated drum-positioning spur gear 45 in a direction to axially displace drum member 30 in the "close" direction, thereby reducing the distance between the magnetic recording surface of drum member 30 and the magnetic head units 73. As drum member 30 is axially displaced in the "close" direction, the amplitude of the clock signals recorded upon the recording surface by the magnetic recording head 76 (FIGURE 13) and the alternating current signal appearing in line 78 from magnetic pick-up unit 77 and amplifier 74, if required, increases in magnitude, because of improved magnetic efficiency with closer proximity between the magnetic recording head 76 and the magnetic recording surface of the drum 30, until a potential level of sufficient magnitude is reached to bias diode 81 to conduction during the positive excursions of the signal potential cycles. At this time, diode 81 assumes control, and drum member 30 may interrupt the light from source 149, as photo-cell 150 is no longer a factor in the sensing circuit. The conduction of diode 81 during the positive excursions of the alternating current signal cycles appearing in line 78 maintains a positive charge upon capacitor 153 and a positive bias upon suppressor grid 126, thereby maintaining conduction through gas tube 113 during each positive excursion of the alternating current supply potential.

As the distance between the magnetic recording surface of drum 30 and the magnetic head units 73 continues to decrease with axial movement of drum 30 in the "close" direction, the amplitude of the alternating current signal appearing in line 78 continues to increase in magnitude because of increased magnetic efficiency between the recording surface and record head 76 With this increase in magnitude of signal level, diode 84 begins to conduct more heavily during the negative excursion. With diode 84 conducting more heavily during the negative excursions of the signal cycles, a negative charge is placed upon capacitor 154 and the potential of point 99 goes negative, thereby placing a negative potential bias on control grid 127 of gas tube 113. Gas tube 113 is extinguished during each negative excursion of the supply alternating current potential cycles, and this negative bias upon control grid 127 prevents tube 113 from re-igniting during the positive excursions. With tube 113 not conducting, coil 117 of relay 120 is no longer energized, and contacts 144 open, thereby interrupting the supply circuit to the "close" windings of servo motor 70. With the supply circuit to the "close" windings interrupted, axial displacement of drum member 30 ceases. By measuring the amplitude of the signal appearing in line 78 with the recording surface at the desired distance from the magnetic head units 73 and adjusting wiper arm 96 of potentiometer 97 accordingly, drum member 30 may be placed in correct operating position relative to the head units through the operation of the portion of the sensing circuitry just described. As the distance between the magnetic recording surface of drum 30 and the magnetic head units 73 remains constant, diode 84 continues to conduct heavily during the negative excursions of the alternating current signal cycles appearing in line 78 and maintains the negative charge upon capacitor 154, which is applied to the control grid 127 of gas tube 113, thereby keeping tube 113 in a cut-off condition and maintaining drum member 30 in this position.

In the event the dimensions of any portion of the system should change, for any reason, in a direction to further decrease the distance between the magnetic recording surface of drum 30 and the magnetic head units 73, the amplitude of the alternating current signal appearing in line 78 from pick-up head 77 will increase in magnitude, because of improved magnetic efficiency, to a level sufficient to bias the anodes 85 and 86 of duo-diode 87 more positive in respect to the cathodes 106 and 107 during the positive excursions of the signal cycles, thereby permitting diode 87 to conduct more heavily. With diode 87 conducting more heavily during the positive excursions of the signal cycles, a positive charge is placed upon capacitor 155, and the potential of point 103 goes positive, thereby placing a positive potential bias upon the control grids 128 and 129 of the gas tubes 114 and 115, respectively. As the anodes 111 and 112 of the gas tubes 114 and 115, respectively, are connected to the alternating current supply potential source 116, these tubes conduct during the positive excursions of the alternating current supply potential cycles, thereby producing a first signal which energizes relay coils 118 and 119 of relays 121 and 122, respectively. With the energization of the coils 118 and 119, respective normally open contacts 141 and 142 are closed, completing a circuit for the "open" windings of servo motor 70 from the supply potential source 116 through limit switch 140; line 137; servo motor 70; line 136; and normally open contacts 141 and 142 of relays 121 and 122, respectively, which are now closed, since coils 118 and 119 are energized, to ground.

Upon the completion of this circuit, servo motor 70 is energized to revolve in the proper direction to drive worm gear 72 (FIGURE 2) and the associated drum-positioning spur gear 45 in a direction to axially displace drum member 30 in the "open" direction, thereby increasing the distance between the magnetic recording surface of drum member 30 and the magnetic head units 73. As the distance between the magnetic recording surface and the magnetic head units is increased by this axial displacement, the amplitude of the alternating current signal in line 78 is reduced in magnitude. At this time, conduction through diode 87 is reduced to or near cut-off, and point 103 returns to its normal negative potential, placing a negative bias upon the control grids 128 and 129 of the gas tubes 114 and 115. The gas tubes 114 and 115 are extinguished during the negative excursions of the supply potential cycles and are prevented from being re-ignited during the positive excursions by this negative control grid bias. With the tubes 114 and 115 not conducting, coil 118 of relay 121 and coil 119 of relay 122 are no longer energized, and contacts 141 and 142 open, thereby interrupting the supply circuit to the "open" windings of servo motor 70. With the supply circuit to the "open" windings interrupted, axial displacement of drum member 30 ceases, and its position, relative to the magnetic head units 73, remains substantially constant.

From a review of the circuit, it is apparent that either the first signal produced by tube 114 energizing coil 118 of relay 121, thereby closing contacts 141, or the first signal produced by tube 115 energizing coil 119 of relay 122, thereby closing contacts 132, will complete the supply circuit to the "open" windings of servo motor 70. As the energization of these windings will cause motor 70 to revolve in the direction which will increase the distance between the magnetic recording surface of drum member 30 and the magnetic head units 73, it is important that this circuit be substantially fail-proof. For this reason, two gas tubes may be employed, as indicated, whereby, in the event of the failure of either one, the circuit will remain operative.

Assuming now that the dimensions of any portion of the system should change for any reason in a direction to increase the distance between the magnetic recording surface of drum 30 and the magnetic head units 73, the amplitude of the alternating current signal appearing in line 78 from pick-up head 77 will decrease in magnitude, because of reduced magnetic efficiency. During the negative excursions of the signal cycles, conduction through diode 84 is reduced to or near cut-off, and point 99 returns to the normally positive potential, thereby placing a positive potential bias upon control grid 127 of gas tube 113. Because the suppressor grid 126 is also biased positively from point 88 and the anode 110 is connected to the alternating current supply potential, tube 113 will conduct during the positive excursions of the alternating current supply potential cycles, thereby producing a second signal, which energizes coil 117 of relay 120. As coil 117 is energized, normally open contacts 144 are closed, completing a circuit for the "close" windings of servo motor 70 from supply potential source 116 through normally closed contacts 124 of relay 125; line 123; line 138; servo motor 70; line 139; normally open contacts 144, which are now closed as coil 117 is energized; normally closed contacts 146 of relay 122; and normally closed contacts 145 of relay 121 to ground. Normally closed contacts 145 and 146 are included as an additionally safety feature to remove ground from the "close" windings of servo motor 70 when relays 121 and 122 are operated. These contacts may be removed and the movable arm of contacts 144 returned to ground without altering the operation of this circuit.

Upon the completion of this circuit, servo motor 70 is energized to revolve in the proper direction to drive worm gear 72 (FIGURE 2) and the associated drum-positioning spur gear 45 in a direction to axially displace drum member 30 in the "close" direction, thereby decreasing the distance between the magnetic recording surface of drum 30 and the magnetic head units 73. As the distance between the magnetic recording surface and the magnetic head units is decreased by this axial displacement, the amplitude of the alternating current signal in line 78 is increased in magnitude. At this time, conduction through duo-diode 84 increases during the negative excursions of the signal cycles with the resulting negative potential charge upon capacitor 154 which is applied as a negative bias upon control grid 127 of gas tube 113. Gas tube 113 is extinguished during the negative excursions of the supply potential cycles and is prevented from being re-ignited during the positive excursions by this negative control grid bias. With tube 113 not conducting, coil 117 of relay 120 is unenergized and contacts 144 open, thereby interrupting the supply circuit to the "close" windings of servo motor 70. With the supply circuit to the "close" windings interrupted, axial displacement of drum member 30 ceases, and its position relative to the magnetic head units remains substantially constant until the sensing circuitry detects another change in the signal level appearing in line 78.

In the event the sensing circuit should fail in any respect, an additional safety feature may be provided. This circuit may take the form of a sensing reed 148, which, when placed in intimate contact with the surface of drum 30, will complete a circuit from the grounded drum through reed 148 and coil 147 of relay 125 to the supply potential source 116. As this circuit is closed, coil 147 of relay 125 is energized, thereby closing normally open contacts 156 and 143 and opening normally closed contacts 124. As normally closed contacts 124 are opened, the supply potential is removed from the anodes 110, 111, and 112 of the respective gas tubes 113, 114, and 115, thereby assuring that the coils 117, 118, and 119 of the respective relays 120, 121, and 122 will not be energized at this time. As the normally open contacts 156 are closed, a holding circuit is completed around coil 147, thereby maintaining coil 147 energized, even though the contact may be broken between the reed 148 and the surface of the magnetic drum 30. The closing of the normally open contacts 143 completes a supply circuit for the "open" windings of servo motor 70 from the supply potential source 116 through limit switch 140; line 137; motor 70; line 136; and contacts 143 of relay 125 to ground. Upon the completion of this circuit, servo motor 70 is energized to revolve in the proper direction to drive worm gear 72 (FIGURE 2) and the associated drum-positioning spur gear 45 in a direction to axially displace drum member 30 in the "open" direction. This circuit will remain closed as long as relay coil 147 of relay 125 remains energized; therefore, servo motor 70 will continue to be energized until the drum member 30 has been displaced in the "open" direction to its extreme position. At this position, the motion of drum member 30 is arranged to actuate limit switch 140, which is, of course, normally closed. As limit switch 140 is actuated, its normally closed contacts are opened, thereby interrupting the supply circuit to the "open" windings of servo motor 70, causing motor 70 to stop before the drum-positioning arrangement is damaged.

After the fault which caused the failure of the sensing circuit is repaired, reset button 157 may be operated, which interrupts the holding circuit for coil 147 of relay 120. As coil 147 de-energizes, contacts 143 and 156 open, and contact 124 closes, thereby restoring the supply potential, and the sensing system is again conditioned for normal operation as previously described.

From this description, it is apparent that the sensing system herein defined produces a first signal by tube 114 and/or 115 and a second signal by tube 113 as the distance between the magnetic recording surface of drum member 30 and the magnetic head units 73 becomes less than a predetermined minimum or greater than a predetermined maximum, respectively, and that servo motor 70 is responsive to these signals to actuate drum-positioning spur gear 45 in the proper direction, to axially displace drum member 30 in the "open" direction or in the "close" direction, respectively, to increase the distance between the magnetic recording surface of drum 30 and the magnetic head units 73, or to decrease the distance between the magnetic recording surface of drum 30 and the magnetic head units 73. By carefully adjusting wiper arm 96 of potentiometer 97 and wiper arm 100 of potentiometer 101, the predetermined minimum and maximum distances may be accurately adjusted.

FIGURE 3 illustrates a second embodiment of the present invention, wherein the kinetic energy of the revolving drum is utilized to axially displace axle member 23 and drum member 30. FIGURE 3, therefore, is a view of that portion of FIGURE 1 in which are incorporated the additional elements required in the practice of this embodiment.

A short worm gear 161 is rigidly secured to outer race 31 of the drum member 30 spindle bearing by dowels 162 and 163. As drum member 30 and outer race 31 of the spindle bearing revolve, gear 161 is also rotated, driving spur gear 164. Mounted upon the same shaft as spur gear 164 is a worm gear 165, as shown in FIGURE 15. Worm gear 165 is in operative engagement with another spur gear, 166, which is linked through shaft 167 to another worm gear 168 (FIGURES 3 and 5). It may be noted that the integral magnetic head unit 49 (FIGURE 3) of the clock pulse generator, spur gear 164, worm gear 165, and spur gear 166 are all supported by a housing member 169, which is rigidly clamped to axle member 23 and, therefore, moves with axle 23 in an axial direction. To provide for this axial movement, there is a splined coupling between shaft 167 and spur gear 168, as indicated in FIGURE 5.

Worm gear 168 is arranged to drive a spur gear 170 (FIGURE 5) mounted upon a hollow shaft 171. As spur gear 170 is revolved, hollow shaft 171 is also revolved about a solid shaft 172 and drives another spur gear 173 (FIGURES 5 and 7). Spur gear 173 is in cooperative relation with another spur gear 174 and, as a consequence, drives it in a direction opposite that of spur gear 173. The rotary motion of spur gears 173 and 174 is transmitted through dowel pins to respective plates 175 and 176 (FIGURE 5) of respective magnetic clutches 177 and 178, which may be of any conventional magnetic type. In clutches of this type, the energization of the clutch solenoid, not shown, serves to engage the plate and drum members of the clutch. Clutch plates 175 and 176, therefore, are brought into engagement with the drums of respective clutches 177 and 178 through the energization of associated solenoids.

Should the solenoid of clutch 177 be energized, thereby engaging plate 175 with the drum of clutch 177, the rotary motion of spur gear 173 is transmitted through clutch 177 to shaft 172. As shaft 172 is rotated, spur gear 181 is also rotated in the same direction. The rotary motion of spur gear 181 is transmitted through idler gear 182 to spur gear 183 (FIGURES 5 and 6) mounted upon shaft 184, which may be also driven by clutch 178 but which is now free to be rotated independently as the plate 176 and drum of clutch 178 are disengaged.

The rotary motion of spur gear 183 is further transmitted to spur gear 185, mounted upon shaft 186.

Assuming now that plate 175 is disengaged from the drum of clutch 177 and that the solenoid of clutch 178 is energized, thereby engaging plate 176 with the drum of clutch 178, the rotary motion of spur gear 173 is transmitted through spur gear 174 and clutch 178 to shaft 184 and spur gear 183. Spur gear 183 drives idler gear 182, spur gear 181, and shaft 172, which is now free to rotate independently, as the plate 173 and the drum of clutch 177 are disengaged, and spur gear 185 mounted upon shaft 186.

With this arrangement, shaft 186 may be selectively rotated in either direction from spur gear 173, which always rotates in the same one direction, by energizing either clutch 177 or 178. Assuming that the direction of rotation of spur gear 173 is always clockwise and that clutch 177 is energized, spur gear 181 is also driven clockwise. Spur gear 181 drives spur gear 183 clockwise through idler gear 182, which revolves in a counter-clockwise direction. Spur gear 183, of course, drives spur gear 185 and shaft 186 counter-clockwise. Should clutch 178 be energized, spur gear 173 drives spur gear 174 counter-clockwise, which is transmitted through clutch 178 to spur gear 183. The counter-clockwise motion of spur gear 183 then drives spur gear 185 and shaft 186 clockwise. Therefore, the kinetic energy of rotating drum member 30 may be utilized to rotate shaft 186 in a counter-clockwise direction by energizing clutch 177, or in a clockwise direction by energizing clutch 178.

A worm gear 190 (FIGURE 5), in cooperative relationship with drum-positioning spur gear 45, is revolved with shaft 186, the direction, of course, depending upon which one of the magnetic clutches 177 or 178 is energized. As worm gear 190 drives drum-positioning spur gear 45 in either direction, axle member 23 and drum member 30 are axially displaced through the screw action of the internal threads of drum-positioning spur gear 45, which are in cooperative relationship with the threads 46 of shaft member 23. If neither of the magnetic clutches 177 or 178 is energized, worm gear 190 is, of course, not revolved, and the axial position of the axle member 23 and the drum member 30 remains stationary. Through this mechanical linkage or trains of gears, therefore, the kinetic energy of the rotating magnetic drum 30 is transmitted to the drum-positioning spur gear 45.

With this description of the mechanical linkage required to transmit the kinetic energy of the rotating drum 30 to drum-positioning spur gear 45, the mechanical aspects of the embodiment of FIGURE 3, which differ from those indicated in FIGURE 1, have been described.

The sensing means for producing the first and second signals, as the distance between the recording surface of drum member 30 and the magnetic head units 73 becomes less than a predetermined minimum, or greater than a predetermined maximum, respectively, may be the same as that employed with the embodiment of FIGURE 1 and is detailed in the schematic wiring diagram of FIGURE 14. As the schematic circuit of FIGURE 14 is identical in most respect to the schematic circuit of FIGURE 13, like elements have been given like characters of reference. The only differences between FIGURES 13 and 14 are the substitution of solenoid coils 200 and 201, of respective magnetic clutches 177 and 178, for servo motor 70 and the addition of solenoid 202 and source of positive direct current potential 203 in FIGURE 14.

To engage plate 175 (FIGURE 5) with the drum of clutch 177, solenoid 200 must be energized, and, to engage plate 176 with the drum of clutch 178, solenoid 201 must be energized. For purposes of illustration, it will be assumed that the gearing in the mechanical linkage which transmits the kinetic energy of rotating drum 30 to drum-positioning spur gear 45 is such that, when clutch 177 is engaged, drum-positioning spur gear 45 will be driven in the direction to axially displace drum member 30 in the "close" direction, and that, when clutch 178 is engaged, drum-positioning spur gear 45 will be driven in the direction to axially displace drum member 30 in the "open" direction. For purposes of brevity, clutch 177 and solenoid 200 will hereinafter be referred to as the "close" clutch and solenoid, while clutch 178 and solenoid 201 will hereinafter be referred to as the "open" clutch and solenoid.

For purposes of illustration, it will be assumed that the same initial conditions exist when the system is turned on as were assumed in reference to the description of the circuit of FIGURE 13. The conduction through illuminated photo-cell 150 places point 88 at a positive potential, from source 152, which places a positive bias potential upon suppressor grid 126 of gas tube 113. As control grid 127 of tube 113 is biased positively from point 99, tube 113 conducts during the positive excursions of the supply alternating current potential cycles, thereby energizing coil 117 of relay 120. As relay coil 117 is energized, normally open contacts 144 are closed, completing a circuit for "close" clutch solenoid 200 from source of positive potential 203, through solenoid 200, contacts 144 of relay 120, normally closed contacts 145 of relay 121, and normally closed contacts 146 of relay 122 to ground.

Upon the energization of "close" solenoid 200, plate 175 (FIGURE 5) is placed in engagement with the drum of "close" clutch 177, and the kinetic energy of rotating drum 30 is transmitted through the previously-described mechanical linkage to worm gear 190, which drives drum-positioning spur gear 45 in a direction which will axially displace drum member 30 in the "close" direction, thereby reducing the distance between the magnetic recording surface of drum member 30 and the magnetic head units 73. As drum member 30 is axially displaced in the "close" direction, the amplitude of the alternating current signal appearing in line 78 from magnetic pick-up unit 77 (FIGURE 14) increases in magnitude until a potential level of sufficient magnitude is reached to bias diode 81 to conduction during the positive excursions of the signal potential cycles. At this time, diode 81 assumes control, and drum member 30 may interrupt the light from source 149, as photo-cell 150 is no longer a factor in the sensing circuit. The conduction of diode 81 during the positive excursions of the alternating current signal cycles appearing in line 78 maintains a positive charge upon capacitor 153 and a positive bias upon suppressor grid 126, thereby maintaining gas tube 113 in a conducting condition.

As the distance between the recording surface of drum member 30 and the magnetic head units 73 narrows, the amplitude of the alternating current signal appearing in line 78 continues to increase in amplitude, and the cathodes 82 and 83 of duo-diode 84 are biased more negative in respect to the anodes 104 and 105, during the negative excursions of the signal cycles, permitting diode 84 to conduct more heavily. With diode 84 conducting more heavily, a negative charge is placed upon capacitor 154, and the potential of point 99 goes negative, thereby placing a negative potential bias upon the control grid 127 of gas tube 113, thereby preventing the re-ignition of this tube after it has been extinguished during a negative excursion of the alternating current supply potential. Because gas tube 113 is no longer conducting, "close" solenoid 200 of "close" clutch 177 is de-energized; hence, clutch 177 is disengaged, and drum member 30 is no longer moved in an axial direction. Under these conditions, drum member 30 continues to revolve with its axial position unchanged.

Assuming that, because of dimensional change in any portion of the system for any reason, the distance between the recording surface of drum member 30 and magnetic head units 73 becomes less than the predetermined minimum, the amplitude of the alternating current signal appearing upon line 78 will increase in magnitude to a level sufficient to bias the anodes 85 and 86 of duo-diode 87 more positive in respect to the cathodes 106 and 107 during the positive excursions of the signal cycles, thereby permitting diode 87 to conduct more heavily. With diode 87 conducting more heavily, during the positive excursions of the signal cycles, a positive charge is placed upon capacitor 155, and the potential of point 103 goes positive, thereby placing a positive bias upon control grids 128 and 129 of gas tubes 114 and 115, respectively. Gas tubes 114 and 115 conduct during the positive excursions of the alternating current supply potential, thereby producing a first signal, which energizes relay coils 118 and 119 of relays 121 and 122, respectively. With the energization of coils 118 and 119, the respective normally open contacts 141 and 142 are closed, completing a circuit for "open" solenoid 201 from source of positive potential 203, through solenoid 201, and contacts 141 of relay 121 to ground and also through contacts 142 of relay 122 to ground.

Upon the completion of this circuit, solenoid 201 is energized, bringing the plate 176 (FIGURE 5) and drum of "open" clutch 178 into engagement, and the rotary motion of drum member 30 is transmitted through the mechanical linkage previously described to drum-positioning spur gear 45 and drives spur gear 45 in a direction to axially displace drum member 30 in the "open" direction, thereby increasing the distance between the magnetic recording surface of drum 30 and the magnetic head units 73. As drum member 30 is axially displaced in the "open" direction, the amplitude of the alternating current signals appearing upon line 78 is reduced in magnitude. At this time, conduction through diode 87 is reduced to or near cut-off, and point 103 returns to its normal negative potential, placing a negative bias upon the control grids 128 and 129 of the gas tubes 114 and 115. The gas tubes 114 and 115 are extinguished during the negative excursions of the supply potential cycles and are prevented from being re-ignited during the positive excursions by this negative control grid bias. With tubes 114 and 115 not conducting, coil 118 of relay 121 and coil 119 of relay 122 are no longer energized, and contacts 141 and 142 open, thereby interrupting the circuit to solenoid 201 of "open" clutch 178. With this circuit interrupted, plate 176 of "open" clutch 178 is disengaged from the drum, and axial displacement of drum member 30 ceases.

Assuming that the dimensions of any portion of the system should change for any reason in a manner to increase the distance between the magnetic recording surface of drum 30 and the magnetic head units 73, the amplitude of the alternating current signal appearing in line 78 from pick-up head 77 will decrease in magnitude. During the negative excursions of the signal cycles, conduction through diode 84 is reduced to or near cut-off, and point 99 returns to the normally positive potential, thereby placing a positive potential bias upon control grid 127 of gas tube 113. Because the suppressor grid 126 is also biased positively from point 88 and the anode 110 is connected to the alternating current supply potential, tube 113 will conduct during the positive excursions of the alternating current supply potential, thereby producing a second signal which energizes coil 117 of relay 120. As coil 117 is energized, normally open contacts 144 are closed, completing a circuit for the "close" solenoid 200 of "close" clutch 177 (FIGURE 5) from source of direct current potential 203 (FIGURE 14), through solenoid 200, contacts 144 of relay 120, contacts 145 of relay 121, and contacts 146 of relay 122 to ground. Normally closed contacts 145 and 146 of relays 121 and 122, respectively, are included as an additional safety feature to remove ground from "close" solenoid 200 when relays 121 and 122 are operated. These contacts may be removed and the movable arm of contacts 144 returned to ground without altering the operation of this circuit.

Upon the completion of this circuit, solenoid 200 is energized, bringing the plate 175 (FIGURE 5) and drum of "close" clutch 177 into engagement, and the rotary motion of drum 30 is transmitted through the mechanical linkage previously described to drum-positioning spur gear 45 and drives spur gear 45 in a direction to axially displace drum member 30 in the "close" direction, thereby decreasing the distance between the magnetic recording surface of drum 30 and the magnetic head units 73. Drum member 30 is axially displaced in the "close" direction, and the amplitude of the alternating current signals appearing in line 78 is increased in magnitude. At this time, conduction through duo-diode 84 increases during the negative excursions of the signal cycles with the resulting negative potential charge upon capacitor 154 which is applied as a negative bias upon control grid 127 of gas tube 113. Gas tube 113 is extinguished during the negative excursions of the supply potential cycles and is prevented from being re-ignited during the positive excursions by this negative control grid bias. With tube 113 not conducting, coil 117 of relay 120 is unenergized and contacts 144 open, thereby interrupting the supply circuit to "close" solenoid 200 of "close" clutch 177 (FIGURE 5). With this supply circuit interrupted, axial displacement of drum member 30 ceases, and its position relative to the magnetic head units remains substantially constant until the sensing circuitry detects another change in magnetic recording surface-magnetic head clearance.

Summing up the system just described, the clutch members 178 and 177 are actuating members, in cooperative relationship with the mechanical linkage or gear train and drum-positioning spur gear 45, which are responsive to the first and second signals, respectively, for rendering drum-positioning spur gear 45 operative to axially displace drum member 30.

As a safety feature in the event of a malfunction of the sensing circuitry, a reed member 148 is located adjacent to drum member 30. Should drum member 30 be axially displaced in the "close" direction to such an extent as to become dangerously near magnetic head units 73, an intimate contact is made between drum 30 and reed 148. This contact completes a circuit from the grounded drum through reed 148 and coil 147 of relay 125 to the supply potential source 116. The completion of this circuit energizes coil 147 of relay 125, thereby closing normally open contacts 156 and 143 and opening normally closed contacts 124. As normally closed contacts 124 are opened, supply potential is removed from the anodes 110, 111, and 112 of the respective gas tubes 113, 114, and 115. As the normally open contacts 156 are closed, a holding circuit is completed around coil 147, thereby maintaining coil 147 energized even though the contact between reed 148 and drum member 30 may be broken. Upon the closure of the normally open contacts 143, a supply circuit is completed for "open" solenoid 201, from ground, through contacts 143 of relay 125 and solenoid 201 to source of positive potential 203. Upon the completion of this circuit, the plate 176 (FIGURE 5) is engaged with the drum of "open" clutch 178, and drum-positioning spur gear 45 is driven in the proper direction for axially displacing drum member 30 in the "open" direction, thereby increasing the distance between the magnetic recording surface of drum 30 and magnetic head units 73. After the fault has been cleared and the sensing circuit again rendered operative, the holding circuit about coil 147 of relay 125 may be opened by operating reset button 157, thereby restoring the alternating current supply potential, and the sensing system is again prepared for normal operation, as previously described.

As an additional safety feature in the event the alternating current supply potential is lost, a potential sensing solenoid 202 is connected between the supply potential source 116 and ground. With this connection, of course, solenoid 202 is energized with the presence of an alternating current supply potential. Solenoid 202 is physically located as indicated in FIGURE 5, and is arranged in such a manner that its plunger 204 operates a lever member 205, which is pivoted about point 206 and is arranged to mechanically engage the plate member 176 of "open" clutch 178. With solenoid 202 energized, the plunger member 204 holds the lever member 205 in the position as indicated in FIGURE 5. In this position, plate 176 of "open" clutch 178 is in a disengaged relationship. In the event of loss of alternating current supply potential, solenoid 202 becomes deenergized, and spring 207 pivots lever 205 clockwise about point 206, thereby moving plate 176 into an engaged relationship with the drum of "open" clutch 178. As "open" clutch 178 is engaged, drum member 30 is axially displaced in the "open" direction through the mechanical linkage previously described. Upon the reapplication of alternating current supply potential, solenoid 202 is again energized. The energization of solenoid 204 pivots lever arm 205 counter-clockwise about pivot 206, thereby overcoming the force of spring member 207. This counter-clockwise motion, of course, disengages the plate 176 and the drum of the clutch 178. With the rotary motion removed from the drum-positioning spur gear 45, the drum member 30 is maintained in that position.

Should drum member 30 be axially displaced in the "open" direction too far, an additional safety feature is activated. As axle member 23 and drum member 30 approach the maximum permissible displacement in the "open" direction, a lever member 211, which is set into a slot 212 in the threaded end 46 of shaft member 23, is axially moved. As lever member 211 is moved, an "over-toggle" spring mechanism operates an auxiliary lever 213, with a snap action. As lever 213 is operated, it lifts another lever member 214, which pivots about point 215 (FIGURE 8). As lever 214 is pivoted in a clockwise direction about point 215, through the action of auxiliary lever 213, lever 205 is pivoted about point 206 in a counter-clockwise direction, through the action of pawl 216. The counter-clockwise motion of lever 205 moves plate 176 out of engagement with the drum of "open" clutch 178, thereby interrupting the transfer of motion to drum-positioning spur gear 45 and stopping axial displacement.

An additional feature of the magnetic recording system of this invention is that drum member 30 may be employed as a gage block for initially accurately positioning the several magnetic head units through the provision of an adjusting arrangement. While such an arrangement may be provided for each magnetic head individually, it may be more economical and desirable to provide for the initial accurate positioning of groups of magnetic head units simultaneously with an adjusting arrangement common to each group. For purposes of illustration, the latter alternative will be described. The selected magnetic head units which are to compose a group may be imbedded within an investment material such as the acrylic or epoxy resins, for example, for purpose of additional magnetic strength and for accurately maintaining the clearances between adjacent magnetic head units. To illustrate, FIGURE 16 is a top plan view of a group of ten magnetic head units, reference numerals 221 through 230, imbedded within an investment material 231.

One example of an adjusting arrangement which may be common to each group is shown in FIGURE 16 and in FIGURE 17, which is a cross-section view of FIGURE 16 taken along line 17—17 and looking in the direction of the arrows. The imbedded magnetic head units are slidably located within a plate member 232 and are engaged on opposite sides by retaining spring members 233 and 234, which are rigidly secured to plate member 232 by screws 235; 236 and 237; 238, respectively. Plate member 232 may be rigidly secured to center unit 22 of the frame member by mounting holes 239 and 240 passing through mounting holes 241 and 242, respectively.

To accurately position each group of magnetic head units, drum member 30 is located substantially at its operating position but is not revolved. Each group of magnetic head units is placed in intimate contact with the recording surface of drum member 30 and securely clamped in this position by tightening of set screws 243; 244 and 245; 246, which engage the free ends of the retaining spring members 233 and 234, respectively.

After all of the groups of magnetic head units have been accurately positioned in this manner, magnetic drum member 30 is axially displaced in the extreme "open" direction, and the system is conditioned for operation as previously described.

It is to be specifically understood that the adjusting method herein described is of but a single form and that other arrangements may be employed without departing from the spirit of this invention.

From the foregoing description of both embodiments of the present invention, it is apparent that a magnetic drum memory system is provided wherein the distance between the magnetic recording surface of a frusto-conical memory drum and associated magnetic head units may be maintained substantially constant during operation through the use of sensitive electronic sensing circuitry which produces first and second signals as this distance becomes less than a predetermined minimum or greater than a predetermined maximum, respectively, and an actuating arrangement which is sensitive to these signals for operating a drum-positioning mechanism.

While two preferred embodiments of the present invention have been shown and described, it will be obvious to those skilled in the art that various modifications and substitutions may be made without departing from the spirit of the invention, which is to be limited only within the scope of the appended claims.

What is claimed is:

1. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; and means responsive to said first and second signals for axially displacing said axle and drum members in a first direction for increasing the distance between said recording surface and said units and in the opposite direction for decreasing the distance between said recording surface and said units, respectively, whereby the distance between said recording surface and said units may be maintained substantially constant during operation.

2. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; drum-positioning means operable to axially displace said axle and drum members; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; and means responsive to said first and second signals for operating said drum-positioning means to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation.

3. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; drum-positioning means operable to axially displace said axle and drum members; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; and servo motor means responsive to said first and second signals for operating said drum-positioning means to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation.

4. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; means responsive to said first and second signals for axially displacing said axle and drum members in a first direction for increasing the distance between said recording surface and said units and in the opposite direction for decreasing the distance between said recording surface and said units, respectively, whereby the distance between said recording surface and said units may be maintained substantially constant during operation; and safety circuit means arranged to axially displace said axle and drum members in the said first direction for increasing the distance between said recording surface and said units in the event of said sensing means failure.

5. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; drum-positioning means operable to axially displace said axle and drum members; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; means responsive to said first and second signals for operating said drum-positioning means to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation; and safety circuit means arranged to render said drum-positioning means operable to axially displace said axle and drum members in the said first direction for increasing the distance between said recording surface and said units in the event of said sensing means failure.

6. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; drum-positioning means operable to axially displace said axle and drum members; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; servo motor means responsive to said first and second signals for operating said drum-positioning means to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation; and safety circuit means arranged to energize said servo motor means whereby said drum-positioning means is operated to axially displace said axle and drum members in the said first direction for increasing the distance between said recording surface and said units in the event of said sensing means failure.

7. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; means for rotating said drum member; drum-positioning means operable to axially displace said axle and drum members; mechanical linkage mean for transmitting the kinetic energy of said rotating drum member to said drum-positioning means; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; and actuating means responsive to said first and second signals in cooperative relationship with said mechanical linkage means and said drum-positioning means for rendering said drum-positioning means operative to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation.

8. A magnetic drum memory system of the type described in claim 7 in which said mechanical linkage means is a train of worm and spur gear members.

9. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; means for rotating said drum member; clock pulse generator means for producing a signal pulse for each bit position around the circumference of said drum member; drum-positioning means operable to axially displace said axle and drum members; mechanical linkage means for transmitting the kinetic energy of said rotating drum member to said drum-positioning means; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; and actuating means responsive to said first and second signals in cooperative relationship with said mechanical linkage means and said drum-positioning means for rendering said drum-positioning means operative to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation.

10. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; means for rotating said drum member; drum-positioning means operable to axially displace said axle and drum members; mechanical linkage means for transmitting the kinetic energy of said rotating drum member to said drum-positioning means; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; actuating means responsive to said first and second signals in cooperative relationship with said mechanical linkage means and said drum-positioning means for rendering said drum-positioning means operative to axially displace said axle and drum members in a first direction for increasing the distance between said recording surface and said units and in the opposite direction for decreasing the distance between said recording surface and said units, respectively, whereby the distance between said recording surface and said units may be maintained substantially constant during operation; and first and second safety means arranged to render said drum-positioning means operable to axially displace said axle and drum members in the said first direction for increasing the distance between said recording surface and said units in the event of said sensing means failure and power failure, respectively.

11. A magnetic drum memory system of the type described in claim 10 in which said mechanical linkage means is a train of worm and spur gear members.

12. A magnetic drum memory system comprising a frame member; an axle member supported by and arranged to be axially displaceable only relative to said frame member; a frusto-conical drum member having a magnetizable recording surface area rotatably mounted upon and arranged to be axially displaceable with said axle member; means for rotating said drum member; clock pulse generator means for producing a signal pulse for each bit position around the circumference of said drum member; drum-positioning means operable to axially displace said axle and drum members; mechanical linkage means for transmitting the kinetic energy of said rotating drum member to said drum-positioning means; a plurality of magnetic head units supported by said frame member, located adjacent to the said recording surface of said drum member and positioned in such a manner that the distance between said recording surface and each of said units is equal to the distance between said recording surface and every other of said units whereby axial movement of said drum and axle members in a first direction will increase the distance between said recording surface and said units while axial movement of said drum and axle members in the opposite direction will decrease the distance between said recording surface and said units; sensing means for producing first and second signals as the distance between said recording surface and said units becomes less than a predetermined minimum or greater than a predetermined maximum, respectively; actuating means responsive to said first and second signals in cooperative relationship with said mechanical linkage means and said drum-positioning means for rendering said drum-positioning means operative to axially displace said axle and drum members in a first direction for increasing the distance between said recording surface and said units in the opposite direction for decreasing the distance between said recording surface and said units, respectively, whereby the distance between said recording surface and said units may be maintained substantially constant during operation; and safety means arranged to render said drum-positioning means operable to axially displace said axle and drum members in the said first direction for increasing the distance between said recording surface and said units in the event of said sensing means failure.

References Cited in the file of this patent

UNITED STATES PATENTS

| | | |
|---|---|---|
| 2,787,750 | Jones | Apr. 2, 1957 |
| 2,880,280 | Gernert et al. | Mar. 31, 1959 |
| 2,915,358 | Richards | Dec. 1, 1959 |